Nov. 24, 1931.  B. FORD  1,833,395

STORAGE BATTERY TERMINAL POST STRUCTURE

Filed March 29, 1926

INVENTOR

Bruce Ford
BY
Augustus B. Stoughton
ATTORNEY.

WITNESS:

Patented Nov. 24, 1931

1,833,395

UNITED STATES PATENT OFFICE

BRUCE FORD, OF PHILADELPHIA, PENNSYLVANIA

STORAGE BATTERY TERMINAL POST STRUCTURE

Application filed March 29, 1926. Serial No. 98,315.

The present invention relates to improvements in terminal posts which extend through a cell cover for connection with a terminal connector.

The principal object of the present invention is to provide efficient, simple and comparatively inexpensive means for retaining grease or the like between the surfaces of the post and terminal connector.

Generally stated, the invention comprises a storage battery terminal post provided on its clamping surface with grease grooves.

The invention also comprises the improvements to be presently described and finally claimed.

Figure 1:
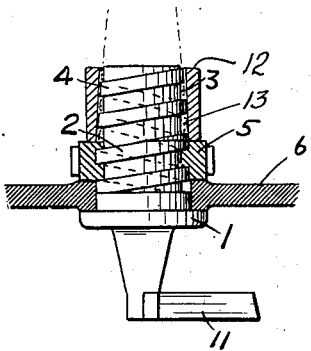
Figure 2:
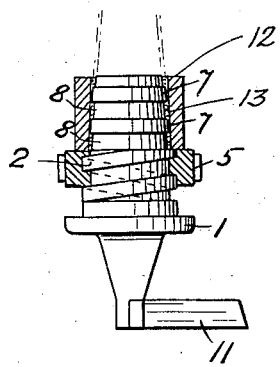
Figure 3:
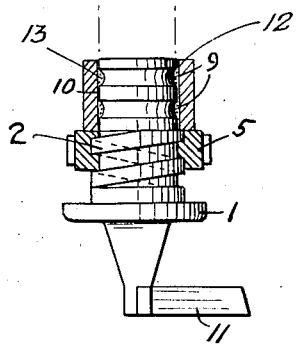

In the following description reference will be made to the accompanying drawings forming part hereof and in which Figure 1 is a view, partly in section illustrating a terminal post embodying features of the invention and also showing certain accessories, and Figures 2 and 3 are similar views illustrating modifications.

Referring to Figure 1, the terminal post is shown mounted complete in connection with the cell cover 6, and sealed thereto as by sealing means comprising the collar 1, threaded portion 2 and nut 5, all working in co-operative relation, and it is provided beyond the thread portion 2 and toward the end of the post with lateral grooves 3 and ribs 4. The grooves and ribs 3 and 4 are in spiral form as a continuation of the thread 2, to permit the nut 5 to be of minimum diameter in relation to the diameter of the ribs 4 and the ribs may taper toward the end of the post. Those skilled in the art understand that the terminal connector 12 is secured to the post after the nut 5 has been mounted on the thread 2. Prior to the application of the terminal connector the grooves 3 are filled with grease and the grooves 3 retain this grease 13 which performs a well understood function which, briefly, is to exclude electrolyte which tends to creep into any space such as not infrequently occurs between the post and the connector, and the purpose of keeping the electrolyte from between the post and connector is to prevent such corrosion or corrosive action as would occur if the electrolyte crept into the space. Frequently clamp terminal connectors are employed and they are often provided with a tapering opening for the post and for that reason the external surface of the ribs 4 of the post is also tapering. The fact that the spiral of the thread 2 and the spiral of the rib 4 constitute a continuous spiral is a matter of convenience but the external diameter of the thread 2 preferably exceeds the external diameter of the rib 4.

The construction and mode of operation of the modification shown in Fig. 2 are as has been described except that the lateral ribs 7 are annular, and are of less external diameter than the thread 2 to permit the nut to slip over them. The grease grooves 8 are disposed between the ribs 7.

The construction and mode of operation of the modification shown in Figure 3 are as has been described in connection with Figure 2 except that the grease grooves 9 which between them provide the ribs 10 are of modified shape and the post is not tapered.

11 is a part of a plate structure.

It will be obvious to those skilled in the art to which the invention relates that modifications may be made in details of construction and arrangement and in mere matters of form without departing from the spirit of the invention which is not limited as to those matters or otherwise than as the prior art and the appended claims may require.

I claim:

1. A combination including a storage battery terminal post provided with a threaded portion and having beyond the thread grease grooves and ribs of less diameter than the external diameter of the thread, a nut mounted on the thread, grease in said grooves, and a cable terminal clamped on the grooved portion.

2. A combination including a storage battery terminal post having a collar and provided with a threaded portion and having beyond the thread grease grooves and ribs of less diameter than the external diameter of the thread, a nut mounted on the thread, grease in said grooves, and a cable terminal clamped on the grooved portion.

BRUCE FORD.